March 15, 1966 S. GEORGE 3,240,081
SYNCHRONIZED DOUBLE ACTION SCREW JACK
Filed July 2, 1962 2 Sheets-Sheet 1

INVENTOR.
STEPHEN GEORGE
BY
*Philip D. H. Green*
ATTORNEY

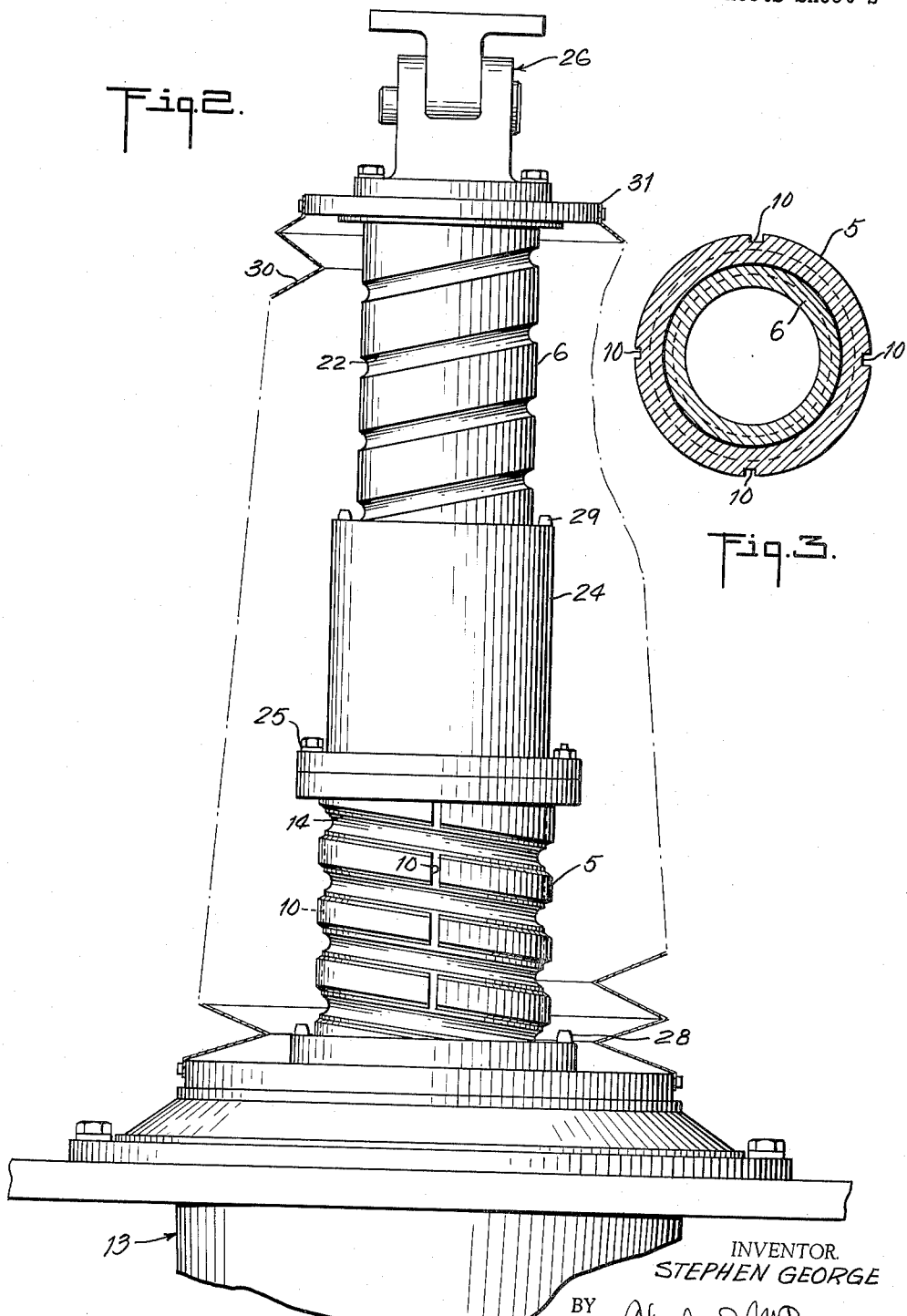

3,240,081
SYNCHRONIZED DOUBLE ACTION SCREW JACK
Stephen George, Pompton Lakes, N.J., assignor, by mesne assignments, to Litton Systems, Inc., Beverly Hills, Calif., a corporation of Maryland
Filed July 2, 1962, Ser. No. 206,608
9 Claims. (Cl. 74—424.8)

The invention herein disclosed relates particularly, though not exclusively, to jacks of the ball screw type and the general objects of the invention are to increase the range of action of such jacks.

This has been accomplished by combining two of the jacks in one compact structure.

In accomplishing this it has been a purpose of the invention to maintain complete synchronization of the combined jacks, whether of the ball screw or conventional screw type.

This has been effected in the ball screw form of the invention, by a combination of outer and inner jack tubes with the outer tube operating in a stationary ball nut and carrying at one end of it a reversely pitched rotary ball nut operating on the inner jack tube.

Other desirable objects accomplished by the invention and further novel features through which such objects are attained are set forth and will appear in the course of the following specification.

The drawings accompanying and forming part of the specification illustrate a present practical embodiment of the invention. Structure however may be modified and changed as regards the present illustration, all within the true intent and scope of the invention as hereinafter defined and claimed.

FIG. 1 in the drawings is a part longitudinal sectional view of one of the jacks in lowered position.

FIG. 2 is a similar view in extended relation.

FIG. 3 is a cross sectional view taken on substantially the plane of line 3—3 of FIG. 1.

Figure 1:
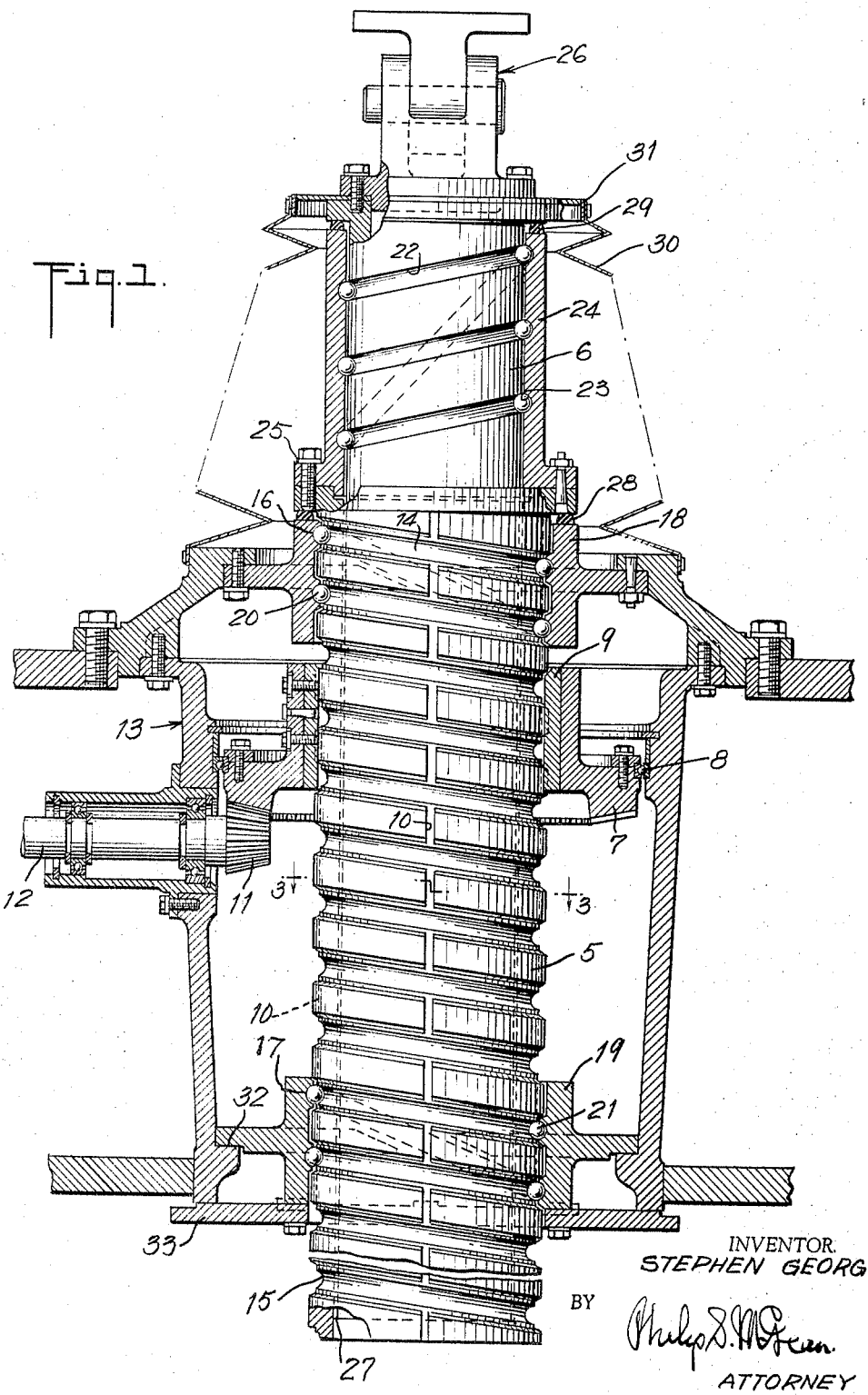

In the construction illustrated the outer jack tube 5 is a rotary driven member and the telescopically related inner jack tube 6 within the outer tube is nonrotatable and constitutes the load carrying member.

Rotation is imparted to the outer tube in the case illustrated by a bevel gear 7 riding on a bearing 8, slidingly fitted over the tube and having keys 9 engaged in longitudinal keyways 10 in the tube.

This gear is driven by bevel pinion 11 on a shaft 12 journaled in the casing 13 housing the gearing and tube structures.

The outer, rotary tube 5 has similar external ball screw pitched grooves 14, 15 in the upper and lower end portions of the same opposed to corresponding internal ball screw pitched grooves 16, 17 in the stationary nut forming elements 18, 19, the balls 20, 21 located in the companion grooves forming the rolling screw connections between the companion elements.

The inner, nonrotating jack tube 6 is shown as having external ball screw grooves 22 reversely inclined and of higher pitch than the screw grooves in the outer tube and matching corresponding internal ball screw grooves 23 in the surrounding sleeve 24 mounted on the upper end of the outer tube and forming a rotary nut element for the inner tube.

The upper, rotary nut element is shown as bolted at 25 directly on the upper end of the outer tube.

The inner jack tube may be held against rotation by the fitting 26 applied to the upper end of it through which the lifting and lowering force may be applied.

The longitudinally separated nut forming elements 18, 19 at the upper and lower ends of the outer tube serve to steady and hold this relatively long member in proper alignment and the inner tube is likewise held in alignment by the nut forming element 24 at the upper end and the bearing land 27 at the lower end slidingly fitting within the outer sleeve.

Combined as illustrated, the two jack forming structures operate in tandem, the inner tube partaking the longitudinal movement of the outer tube plus the added movement of the inner tube within the outer tube and with the two screw couples locked together and necessarily operating in exact synchronism.

In the fully retracted position shown in FIG. 1, the outer tube may rest on a stop at 28 provided on the upper nut forming element 18 and the inner tube may rest on a stop 29 provided at the upper end of the nut forming sleeve 24.

The operating parts may be protected by a surrounding shroud 30 of bellows formation attached at the top to a flange 31 on the upper end of the inner tube and connected to the housing at the bottom.

The lower relatively stationary ball race member 19 is shown as rotatably adjustable on a seat 32 in the lower end of the housing, a lever 33 connected with this member providing convenient means for adjustment to take out backlash.

The outer jack tube may be considered in effect as a more or less unitary sleeve construction having external ball screw races matching the internal ball screw races of the stationary nut forming element and having internal ball screw race matching the external ball screw race of the inner tubular extension member of the jack.

In a conventional screw threaded form of the invention in which the jacks would not have balls interposed between the nuts and screws, the same beneficial effects of absolute synchronism between the two combined jacks would exist.

What is claimed is:

1. A double action ball screw jack comprising the combination of
   a rotary jack tube having an external ball screw race,
   a stationary nut member having a matching internal screw race,
   connecting balls operating in said matching races to form a first ball screw couple,
   a rotating ball nut forming member on one end of said jack tube having an internal ball screw race reversely inclined to the ball race of said jack tube,
   a nonrotating jack member within said jack tube and having an external ball screw race matching said internal ball screw race of said rotating ball screw nut member,
   balls operating in and joining said matching ball races in said rotating ball screw nut member and said nonrotating jack member to form a second ball screw couple, and
   means for rotating said jack tube to thereby impart longitudinal travel to said nonrotating jack member.

2. The invention according to claim 1 in which the ball screw couple for said rotating jack tube consists of longitudinally separated ball screw units.

3. The invention according to claim 1 in which said screw couple for the nonrotating jack member is of higher pitch than the screw couple for the jack tube.

4. The invention according to claim 1 in which said means for rotating the jack tube includes a rotatably supported gear surrounding the jack tube and having a splined connection with said tube.

5. The invention according to claim 1 with a stop for said nonrotating jack member on the upper end of said rotating ball nut member and a stop on said stationary nut forming member for said jack tube.

6. The invention according to claim 1 in which said nonrotating jack member is of tubular formation and having a sliding fit in said jack tube.

7. The invention according to claim 1 in which said relatively stationary nut forming member is rotatably adjustable to take out backlash.

8. The invention according to claim 1 in which the relatively stationary nut forming member for said jack tube includes separate nut forming elements relatively adjustable to take out backlash.

9. A long range, synchronized double screw ball jack comprising a screw sleeve having an external ball screw groove and an internal ball screw groove, an external nut element having a ball screw groove matching said external ball screw groove, an extension member within said sleeve having an external ball screw groove matching said internal screw groove in the screw sleeve.

balls operating in said matching screw grooves, and means for rotating said screw sleeve, including a drive gear surrounding said screw sleeve and having a sliding spline connection with said screw sleeve.

References Cited by the Examiner

UNITED STATES PATENTS

| | | | |
|---|---|---|---|
| 2,155,157 | 4/1939 | Tyler | 254—102 |
| 2,338,271 | 1/1944 | Ulanet | 74—424.8 |

FOREIGN PATENTS 223,372    1/1942    Switzerland.

DON A WAITE, *Primary Examiner.*